Patented Mar. 31, 1931

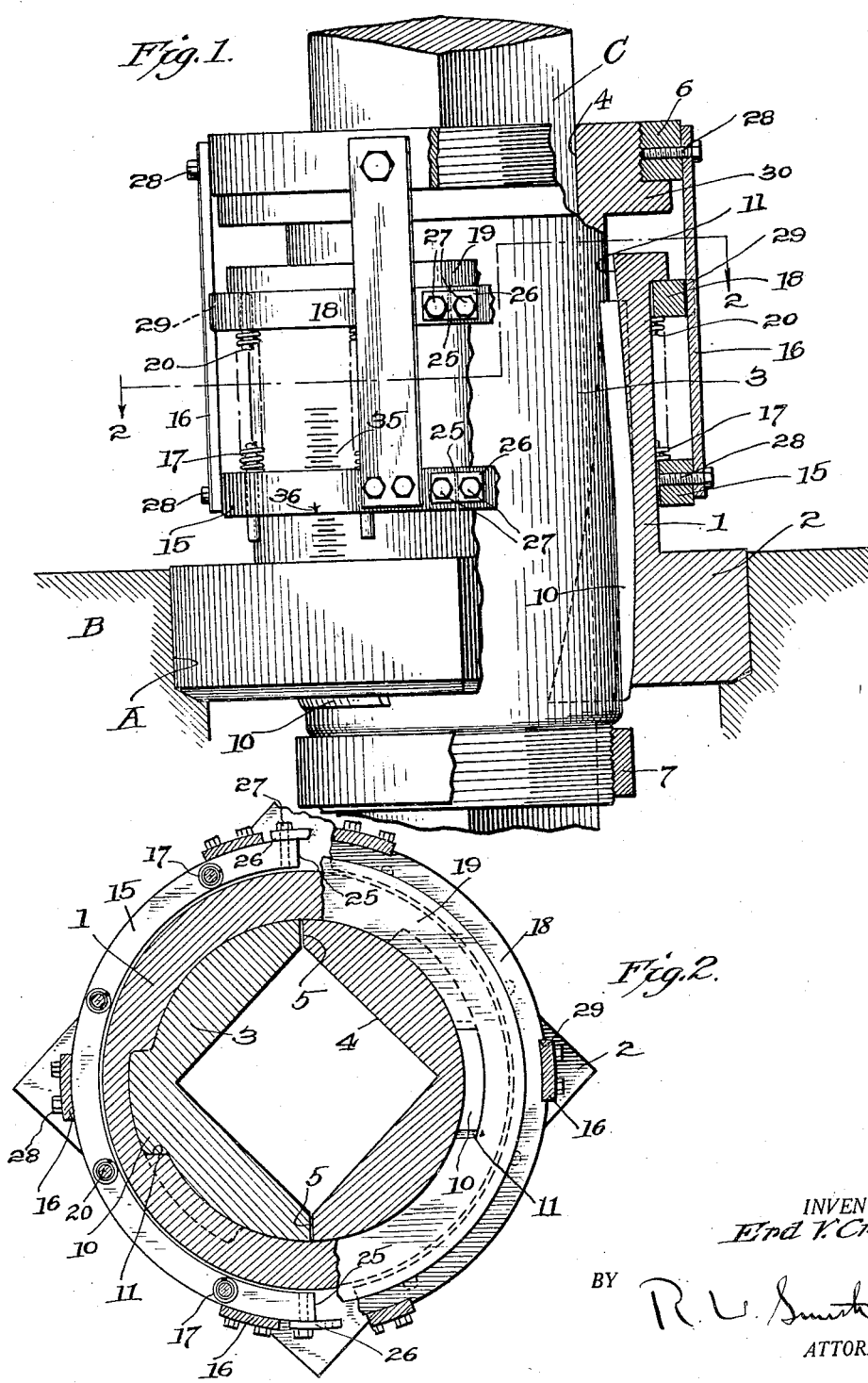

1,798,523

UNITED STATES PATENT OFFICE

ERD V. CROWELL, OF LOS ANGELES, CALIFORNIA

DRIVE MECHANISM FOR ROTARY DRILL PIPE

Application filed January 10, 1929. Serial No. 331,412.

This invention relates to the driving connection between a usual rotary drill table and a string of rotary drill pipe, and has for its object to provide a positive drive which is adapted to yield in accordance with excessive torque strain transmitted to the drill pipe, so as to eliminate the hazard of such excessive strain.

More particularly it is an object of the invention to provide a driving connection adapted for operative mounting in a usual rotary drill table by replacing the usual drill stem bushings, and adapted to operatively engage the usual square drill stem or kelly which is connected to the string of drill pipe, with the driving connection including relatively movable parts which are normally yieldably held against relative movement so as to provide a positive rotary drive, but which are adapted for relative movement in accordance with excessive torque strain which will overcome the yieldable holding means so as to cause corresponding yielding of the positive rotary drive.

It is a still further object of the invention to indicate the torque strain which is transmitted to the string of drill pipe by providing a suitably calibrated means for gauging the movement between the relatively movable parts of the driving connection.

It is a still further object of the invention to provide a driving connection adapted for convenient operative assembly, and providing a simple but durable and reliable structure.

Further objects of the invention will be readily understood from the following description of the accompanying drawings, in which:

Fig. 1 is a side elevation of the invention, partly in axial section.

Fig. 2 is a transverse section on the line 2—2 of Fig. 1.

The driving connection is adapted for mounting in the usual counter-sunk square bore A of a rotary drill table B, and engages the usual square drill stem or kelly C which extends downwardly through the bore of the rotary table with the usual string of drill pipe suspended therefrom. The driving connection includes a bushing 1 having a rectangular base 2 adapted to seat in the counter-sunk bore A for rotating the bushing with the rotary table, and a cooperating bushing 3 is received in the bushing 1 and has a square bore 4 adapted to engage the kelly C. For convenience in mounting the bushing 3 on the kelly C, the bushing is diametrically split as shown at 5, with its two halves adapted to be held in assembled relation by collars 6—7 threaded onto the respective ends of the split bushing beyond the ends of bushing 1.

The bushing 3 has an annular exterior surface adapted for snug sliding fit in the annular bore of bushing 1, and a driving connection is provided between these cooperating annular surfaces whereby the bushing 1 which is rotated by the table B provides a positive rotary drive for the bushing 3 which operatively engages the kelly C, with said positive drive adapted to yield through relative axial movement between bushings 1—3 in accordance with the torque strain transmitted to the kelly. As an instance of this arrangement the exterior annular surface of bushing 3 is provided with spiral lugs 10 adapted for reception in cooperating spiral grooves 11 in the bore of bushing 1 so as to provide a threaded engagement of extremely coarse pitch between the bushings 1—3, and said threaded engagement is so arranged that rotation of bushing 1 with the rotary table in the usual direction will tend to unscrew and thus elevate bushing 3 relative to bushing 1, while holding the bushing 3 against such relative elevation will provide a positive drive for rotating the bushing 3 and the kelly C with the rotary table.

The bushing 3 is yieldably held against elevation relative to bushing 1 so as to prevent unscrewing of the threaded engagement and thus maintain a positive drive, and said holding means is adapted to yield in accordance with the torque strain transmitted to the kelly so as to relieve and indicate excessive strain by the relative movement between bushings 1—3. For this purpose a collar 15 is slidable on bushing 1 and is fixed relative to bushing 3, preferably by longitudinal straps 16 connected at their respective ends to collars 6—15; and springs 17 yieldably hold the collar 15 against elevation relative to bushing 1, as for example by mounting the springs between the collar 15 and a collar 18 which is held against elevation relative to bushing 1. The collar 18 may be held in operative position by engaging beneath an exterior flange 19 at the upper end of bushing 1, and the springs 17 are shown as coil springs mounted on guide rods 20 which depend from collar 18 and are freely slidable through collar 15.

For convenience in assembly of parts, the collars 15—18 may be diametrically split as shown at 25, with the two halves of the respective collars adapted to be fixed in assembled relation forming closed annuli surrounding bushing 1, by means of straps 26 overlying and detachably bolted to the abutting ends of the cooperating halves of the collars as shown at 27. A plurality of the guide rods 20 and springs 17 preferably connect the respective axially alined halves of collars 15—18, and with said collars and their interposed springs operatively assembled on bushing 1, a plurality of the straps 16 are preferably bolted at their respective ends to collars 6—15 as shown at 28, with the straps preferably slidably engaging in recesses 29 in the outer peripheral surface of collar 18 for maintaining axial alinement of the collars.

In operation the springs 17 will hold the collar 15 in maximum spaced relation relative to collar 18 for abutment of the flanged end 30 of bushing 3 against flange 19 as long as the torque strain transmitted to the kelly C does not exceed the tension of the springs, and by thus holding the bushing 3 against unscrewing movement relative to bushing 1 a positive rotary drive is provided between the bushings, but when the torque strain exceeds the yieldable resistance of springs 17, the rotation of bushing 1 unscrews the bushing 3 and elevates it in accordance with the yielding of the springs as shown in Fig. 1, thereby correspondingly relieving the positive rotary drive and the torque strain transmitted to the kelly C. If the springs are compressed to their maximum they will of course prevent further relative elevation of bushing 3 and thus limit unscrewing of the threaded engagement for relieving the torque strain, but before this point is reached the relative elevation of bushing 3 will have been noted by the operator and steps will have been taken to reduce the hazard of excessive strain.

The relative elevation of bushing 3 is preferably indicated in terms of torque strain by a suitably calibrated gauge, which may comprise vertically spaced scale markings 35 on the bushing 1 adapted to be read by an indicator which is vertically movable with bushing 3 and which is shown as a suitable index 36 provided on collar 15.

The invention thus provides a practical driving connection for drill pipe, adapted for use in connection with a usual rotary drill table, and providing a positive drive adapted to yield in accordance with excessive torque strain, and conveniently indicating and gauging such excessive strain; and the invention is adapted to replace usual kelly bushings and operatively engage a usual kelly, with the parts arranged for convenient assembly on the kelly and ready mounting in the usual bore which is provided in rotary tables for usual kelly bushings.

I claim:

1. In combination, a rotary drill table having a bore adapted to receive kelly bushings, a driving bushing adapted to replace the usual kelly bushings in said bore for rotation with the table, a driven bushing adapted for mounting in the driving bushing and having a bore adapted to receive a usual kelly for turning the kelly with the driven bushing, and means for yieldably holding the driving and driven bushings against relative movement so as to provide a positive driving connection between said parts, the said holding means being adapted to yield in accordance with torque strain transmitted to the kelly.

2. In combination, a rotary drill table having a bore adapted to receive kelly bushings, a driving bushing adapted to replace the usual kelly bushings in said bore for rotation with the table, a driven bushing adapted for mounting in the driving bushing and having a bore adapted to receive a usual kelly for turning the kelly for turning the drill stem with the driven bushing, the said bushings having a threaded engagement of coarse pitch adapted to turn the driven bushing by rotation of the driving bushing and tending to unscrew and elevate the driven bushing relative to the driving bushing, and means for yieldably holding the bushings against such relative axial movement, the said holding means being adapted to yield in accordance with torque strain transmitted to the kelly.

3. In combination, a driving bushing adapted for mounting in a rotary drill table for rotation with the table, a driven bushing adapted for mounting in the driving bushing and adapted to receive a drill stem for turning the drill stem with the driven bushing, the said bushings having a driving connection adapted to yield in accordance with turning the drill stem with the driven bushings, a collar slidably mounted on the driving bushing and axially fixed relative to the driven bushing, and means for yieldably holding the collar against axial sliding movement on the driving bushing and thereby yieldably holding the bushings against relative axial movement, the said holding means being adapted to yield in accordance with torque strain transmitted to the drill stem.

4. In combination, a rotary drill table having a bore adapted to receive kelly bushings, a driving bushing adapted to replace the usual kelly bushings in said bore for rotation with the table, a diametrically split driven bushing having a bore adapted to receive a usual kelly for turning the same, means for fixing the assembled split bushing on the kelly, the said assembled driven bushing being adapted for mounting in the driving bushing, and means for yieldably holding the driving and driven bushings against relative movement so as to provide a positive driving connection between said parts, the said holding means being adapted to yield in accordance with torque strain transmitted to the kelly.

5. In combination, a driving bushing adapted for mounting in a rotary drill table for rotation with the table, a driven bushing adapted for mounting in the driving bushing and adapted to receive a drill stem for turning the drill stem with the driven bushing, the said bushings having a driving connection adapted to yield in accordance with relative axial movement between the bushings, a diametrically split collar adapted for assembled axially slidable mounting on the driving bushing, means for axially fixing the assembled collar relative to the driven bushing, and means for yieldably holding the collar against axial sliding movement on the driving bushing and thereby yieldably holding the bushings against relative axial movement, the said holding means being adapted to yield in accordance with torque strain transmitted to the drill stem.

6. In combination, a driving bushing adapted for mounting in a rotary drill table for rotation with the table, a driven bushing adapted for mounting in the driving bushing and adapted to receive a drill stem for turning the drill stem with the driven bushing, the said bushings having a driving connection adapted to yield in accordance with relative axial movement between the bushings, a collar slidably mounted on one of said bushings and axially fixed relative to the other bushing, and means for yieldably holding the collar against axial sliding movement on said first bushing and thereby yieldably holding the bushings against relative axial movement, the said holding means being adapted to yield in accordance with torque strain transmitted to the drill stem.

7. In combination, a driving bushing adapted for mounting in a rotary drill table for rotation with the table, a driven bushing adapted for mounting in the driving bushing and adapted to receive a drill stem for turning the drill stem with the driven bushing, the said bushings having a driving connection adapted to yield in accordance with relative axial movement between the bushings, a diametrically split collar adapted for assembled axially slidable mounting on one of said bushings, means for axially fixing the assembled collar relative to the other bushing, and means for yieldably holding the collar against axial sliding movement on said first bushing and thereby yieldably holding the bushings against relative axial movement, the said holding means being adapted to yield in accordance with torque strain transmitted to the drill stem.

In testimony whereof he has affixed his signature.

ERD V. CROWELL.